Figure 1:
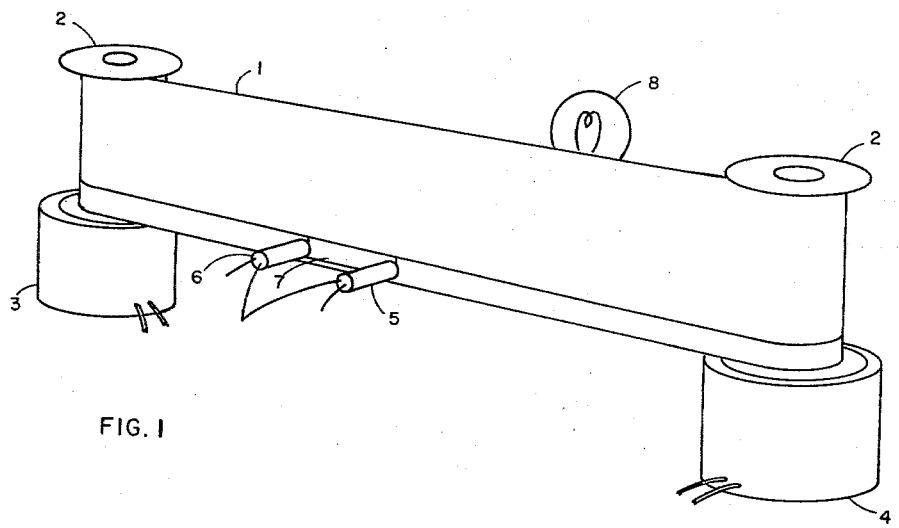

May 18, 1965     J. W. HANNAH     3,184,177
FILM ALIGNMENT AND BRAKING DEVICE
Filed Aug. 6, 1962

United States Patent Office 3,184,177
Patented May 18, 1965

3,184,177
FILM ALIGNMENT AND BRAKING DEVICE
Jack W. Hannah, 653 Cherry St., Galion, Ohio
Filed Aug. 6, 1962, Ser. No. 215,028
4 Claims. (Cl. 242—55.12)

This invention relates to a film alignment and braking device, and relates more particularly to a control means for accurately locating and precisely registering a specific area of a film strip for projection on a viewing screen or the like. Specifically, this invention relates to a device which is capable of aligning individual frames of material located on a film strip in a teaching machine for visual educational purposes.

Rolls of film are generally rotatably supported at their two ends on separate reels with provision being made for winding the film from one reel to the other past a projection means, and for rewinding the film when the entire roll has been viewed. It is often desirable to halt the roll of film at some point between the ends in order to view a particular portion of the film for an extended period of time. It is not difficult to provide means capable of generally locating a chosen area of a film strip, but quickly braking the film and precisely aligning the portion to be viewed presents various problems.

In the past, manual alignment of particular frames on a film strip has been conventional. That is, the operator of a film projecting device would generally locate the desired portion of the film by viewing the strip as it was projected on a screen or the like. He would then render inoperative any automatic means for winding the film from one reel to another, and by manually rotating one of the reels, while visually tracing the projected material, the operator would align a chosen film frame with the projecting means. Such a process is obviously tedious and time consuming. Moreover, the registration of the particular area to be viewed by such a procedure is often not precise.

Various automatic means have been suggested to more readily align a desired portion of a film strip, but such means have always suffered from serious disadvantages. For example, mechanical-electrical registration means such as contact fingers adapted to be biased into slots located at chosen positions in the film strip, thereby breaking the circuit providing energy to the winding mechanism and stopping the winding procedure, have provided only fair alignment. Moreover, after continuous use of the film strip, the repeated rubbing of the contact fingers with the film, and particularly with the registration slots, has tended to tear and otherwise physically degrade the strip. Eventually, the alignment, which was only fair to start with, became so poor as to be relatively useless.

To avoid such physical contact with the film strip, various electrical and photoelectrical means have been suggested. Heretofore, magnetic or photosensitive marks have been provided on the edge of the film to indicate the approach of a desired film frame. A photoelectric cell or the like, receiving a signal from the mark, acted through a relay system to stop the flow of electricity to the mechanism winding the film, thereby braking the device. No matter how carefully or quickly the relay system operated, inertia of the motor means in the winding mechanism caused a drift of the film strip and prevented accurate alignment.

A further disadvantage of most prior art devices is that they usually only functioned to brake the winding mechanism when it operated in one direction. In many machines in use today it is important to be able to accurately align a particular portion of a film strip regardless of the direction of movement of the strip between the two reels on which it is wound. Exemplary of such devices are certain self-operated teaching machines designed to automatically select a series of lessons for the operator-student and project the same on a viewing device for the student to determine the correct answers to various questions. Depending upon the accuracy of the student's answers to the questions set forth in a particular lesson, the machine may be designed to wind the film strip in one direction to provide a more advanced lesson, or in the opposite direction to review previously presented lessons which the student has apparenlty forgotten. Accurate and prompt alignment of the desired lesson with the projecting means is necessary for satisfactory operation of such machines.

It is therefore an object of this invention to provide means for automatically controlling the wind and rewind motors of a film roll whereby a particular area of the film may be quickly located and precisely aligned with a projecting means.

Another object of the instant invention is to provide film braking and aligning means wherein the film strip is not physically contacted or otherwise deleteriously affected by extended use.

A still further object of this invention is the provision of a device for precisely registering a film strip at a chosen location regardless of the initial direction of movement of said strip.

Another object of the instant invention is to provide means for braking and aligning a desired portion of a film strip free from the foregoing and other disadvantages.

Other objects and advantages of this invention, together with certain details of construction and combination of parts, will be apparent from the following detailed description and will be particularly pointed out in the appended claims.

Figure 2:
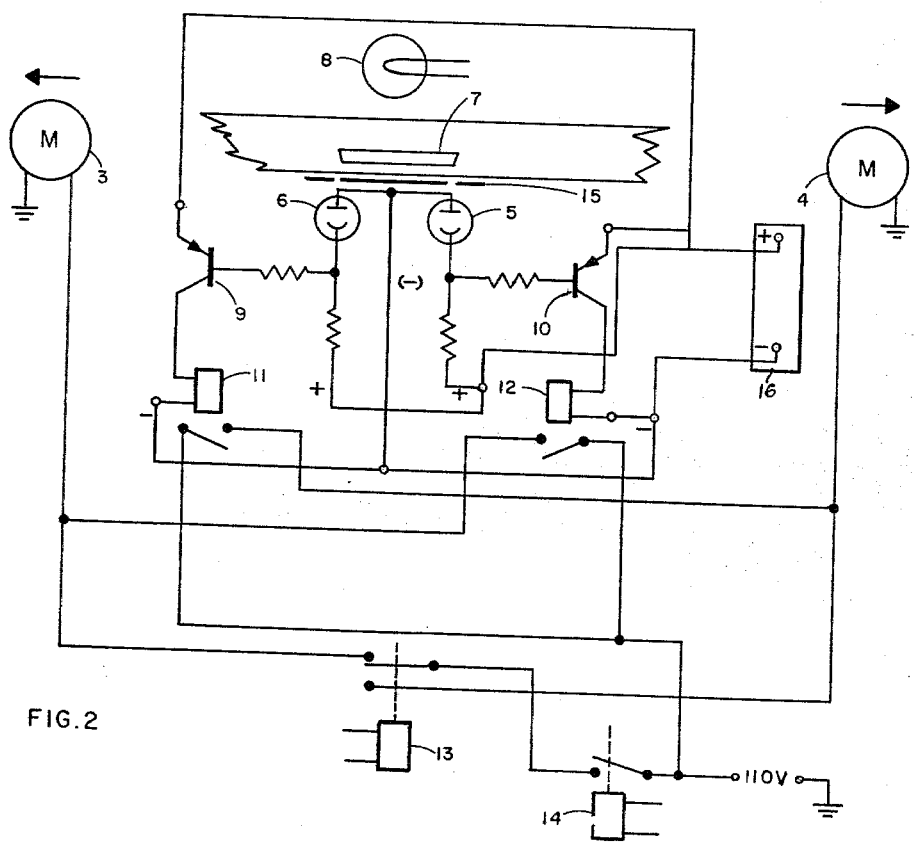

In the drawings, wherein a preferred embodiment of this invention is shown,

FIGURE 1 is a pictorial view of a film braking and alignment device in accordance with this invention; and FIGURE 2 is a schematic view of an electrical circuit for the device of the instant invention.

Like reference numerals indicate like parts in both figures.

Referring now to the drawings for a detailed description of a preferred embodiment of the instant invention, reference numeral 1 indicates a film strip windingly supported at its two ends on reels 2. Motors 3 and 4 are operatively connected to each of the reels to rotate the same about their respective axes in the direction of the arrows in FIGURE 2. When motor 3 is energized, film strip 1 is wound upon the left-hand reel 2 and motor 4 provides an idle drag on the right-hand reel 2 to maintain the film strip 1 under a slight tension. When motor 4 is energized, film strip 1 is wound in the other direction on the right-hand reel 2 and motor 3 provides an idle drag. In normal operation, that is, except during the aligning operation, the activation of either motor 3 or 4 is caused by closure of the switch controlled by relay 14 (note FIGURE 2). Whether the film strip 1 is moved to the left or the right is determined by the switch controlled by relay 13 which may be manually energized by the operator to selectively drive the film strip 1 in a chosen direction. In a teaching machine of the type described hereinabove, the relay 13 would be automatically energized to wind the film in one direction or the other in response to the accuracy of the answers by the student-operator. For simplification, normal operation shall be designated to be when relay 13 is not energized, thereby directing current from the 110 v. power source to motor 3, moving the film strip 1 to the left.

In the preferred embodiment, the lower edge of film strip 1 is opaque. Whenever there is material on the remaining portion of the film strip 1 which is to be precisely aligned, this opaque portion is broken by an elongated transparent registration slot 7. It is to be understood that registration slot 7 may either be a cut-out portion or merely a transparent portion of the film. The latter embodiment is preferred since the necessity of cutting the film is avoided and the integrity of the film strip 1 is maintained, thereby decreasing the likelihood of degradation over extended use. Moreover, the particular configuration of the registration slot 7 is not critical as long as it is somewhat elongated in shape and has precise limits at its extremities. For this reason, a rectangular or trapezoidal shape is particularly useful. Photocells 5 and 6 are aligned with the path of travel of the registration slot 7 and are spaced apart on one side of the film strip 1 at a distance approximately equal to, or slightly in excess of, the width of said slot. On the opposite side of film strip 1 a light source, for example, lamp 8, is located.

When the film strip 1 is moved so that registration slot 7 is in the vicinity of photocells 5 and 6, other means, not shown and not forming part of this invention, open relay 14 and cause motors 3 and 4 to be de-energized. As pointed out hereinabove, no matter how carefully or quickly relay 14 is opened, inertia of the motors would cause further drift and prevent film strip 1 from being precisely aligned. However, according to the instant invention, assuming, for example, that film strip 1 has been moving to the left, that is, motor 3 has been driving the left-hand reel 2 in the direction of the arrow shown in FIGURE 2 and motor 4 has been providing an idle drag, light from lamp 8 would pass through registration slot 7 and activate photocell 6. Referring particularly to FIGURE 2, it will be seen that activation of photocell 6 would produce a negative potential on the base of transistor 9, causing this transistor to conduct. When transistor 9 is conducting it causes relay 11 to close its contact and current from the 110 v. power source is directed to motor 4, rendering it operative. Motor 4 will move film strip 1 to the right, thereby correcting the original overshoot to the left. If the inertia in motor 4 causes film strip 1 to overshoot slightly to the right, registration slot 7 moves past photocell 5 and allows light from lamp 8 to activate the same. Meanwhile, photocell 6 is moved out of the path of light through registration slot 7 and motor 4 is rendered inoperative. Activation of photocell 5 causes transistor 10, and hence relay 12, to operate in the same manner as described hereinabove for transistor 9 and relay 11. This, in turn, allows current from the 110 v. power source to operate motor 3 and move the film back to the left. As will be apparent from FIGURE 2, the transistors 9, 10 and relays 11, 12 are connected to a source of potential 16.

By the above-described process, film strip 1 is first moved in one direction and then in the other direction, each time to a slighter degree, until it settles precisely at the point where the extremities of registration slot 7 are at the point midway between photocells 5 and 6. In this position, light from lamp 8 will be precluded from reaching either photocell and the film strip 1 will be maintained stationary with a desired area precisley located.

The alignment may be made even more precise by providing a screen such as shown at 15, having slits therein rendering all but a small portion of the photocell opaque to light. Preliminary experiments with the device of the instant invention have provided alignment of the film strip to a tolerance of 0.01 inch in three oscillations, regardless of the initial direction of travel.

While a preferred embodiment of the device of the instant invention has been described hereinabove, it would be obvious to those skilled in the art that various changes and modifications are possible. For example, the edge of the film strip can be made transparent with opaque registration slots and photocells spaced apart a distance approximately equal to the width of the registration slot. Moreover, a single reversible motor may be operatively connected to both reels in place of the two motors shown. It is clear that any such device would provide a film braking and alignment means capable of quickly and accurately aligning a chosen portion of a film strip regardless of the initial direction of travel, and without actual contact of the device with the film.

It is to be understood that the foregoing detailed description is given merely by way of illustration and that many variations may be made therein without departing from the spirit of this invention.

What is desired to be secured by letters patent is:

1. In an apparatus wherein a film strip is wound between two reels, each of said reels operatively connected to and rotated by a motor, each motor causing said film strip to move in one direction while the other motor drags idle, and the power to said motors is controlled by a means which stops the film strip in a generally desired location, the improvement which comprises means for automatically aligning said film strip at a precise position in said generally desired location, wherein said latter means includes a light source located on one side of said film strip, a registration slot having two extremities in the direction of travel of said film strip and having an ability to transmit light different from the remainder of said film strip, and two photocells located on the side of said film strip remote from said light source, said photocells being spaced apart a distance approximately equal to the distance between the extremities of said registration slot, means connecting said photocells to said motors for energization thereof, and means responsive to a variation in light on said photocells to counter a movement of said film strip in either direction with an opposite force from one of said motors, whereby the film is aligned in said precise position with the ends of said registration slot adjacent the photocells.

2. An apparatus in accordance with claim 1 wherein said registration slot is transparent, the remainder of said film strip is opaque, and said photocells are spaced apart a distance slightly in excess of the distance between the extremities of said registration slot.

3. An apparatus in accordance with claim 1 wherein said registration slot is opaque, the remainder of said film strip is transparent, and said photocells are spaced apart a distance approximately equal to the distance between the extremities of said registration slot.

4. An apparatus in accordance with claim 1 wherein an opaque screen is provided between said photocells and said film strip, said screen having slits therein limiting the amount of light capable of reaching said photocells.

References Cited by the Examiner

UNITED STATES PATENTS

| 2,670,212 | 2/54 | Heller et al. | 242—55.12 X |
| 2,900,132 | 8/59 | Burns et al. | 179—100.25 |
| 2,971,716 | 2/61 | Sampson | 242—55.13 |
| 3,007,703 | 11/61 | Davies | 242—57 X |
| 3,013,459 | 12/61 | Coleman | 226—45 X |

MERVIN STEIN, *Primary Examiner.*

RUSSELL C. MADER, *Examiner.*